(12) United States Patent
Smith

(10) Patent No.: US 6,221,656 B1
(45) Date of Patent: Apr. 24, 2001

(54) COMPOST, SILAGE, SOLAR HEATING APPARATUS

(76) Inventor: Raymond H. Smith, Rte. 2 - 5AAA, Larned, KS (US) 67550

( * ) Notice: Subject to any disclaimer, the term of this patent is extended or adjusted under 35 U.S.C. 154(b) by 0 days.

(21) Appl. No.: 09/006,368

(22) Filed: Jan. 13, 1998

(51) Int. Cl.[7] .................................................. C12M 3/00
(52) U.S. Cl. ........................................ 435/290.1; 126/609
(58) Field of Search ........................ 126/609; 435/289.1, 435/290.1, 290.2

(56) References Cited

U.S. PATENT DOCUMENTS

| | | | |
|---|---|---|---|
| 4,174,371 | * 11/1979 | Bell et al. ............................... | 422/109 |
| 4,795,711 | * 1/1989 | Nockemann ........................ | 435/316 |
| 4,936,290 | * 6/1990 | Smith .................................. | 126/436 |
| 5,206,169 | * 4/1993 | Bland .................................. | 435/284 |

* cited by examiner

Primary Examiner—David A. Redding
(74) Attorney, Agent, or Firm—Litman, Kraai & Brown L.L.C.

(57) ABSTRACT

An apparatus combining various phases of solar heat influence upon a transversing airstream. Solar heat combines with compost's bacterial-generated heat within the apparatus. Solar collector mechanism and compost cooperate with silage for regulating more even heat output.

19 Claims, 8 Drawing Sheets

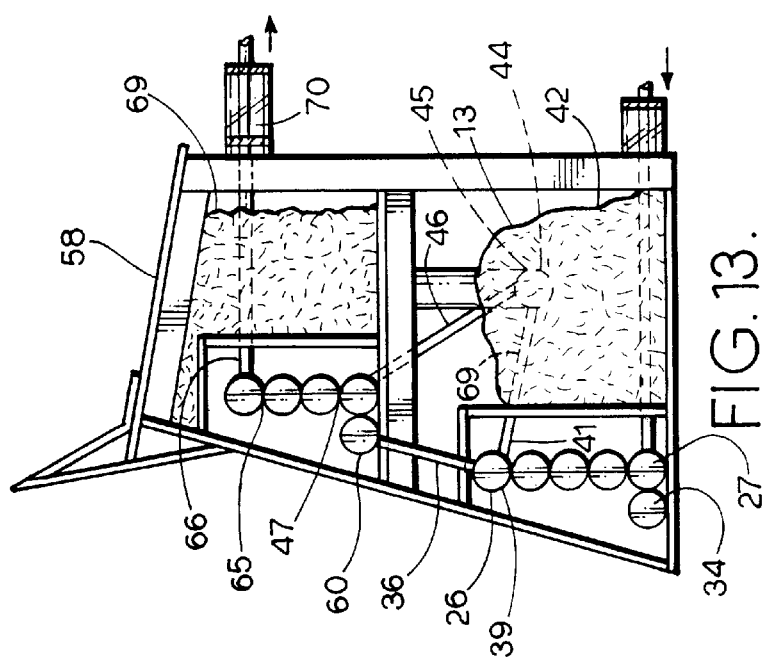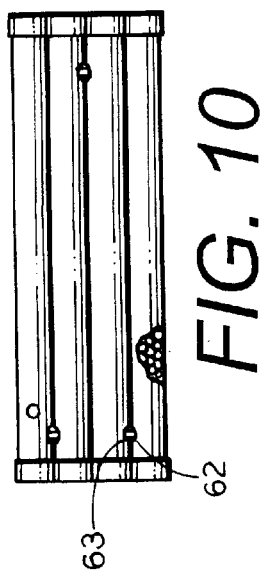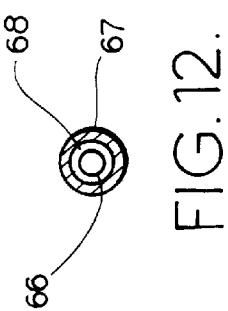

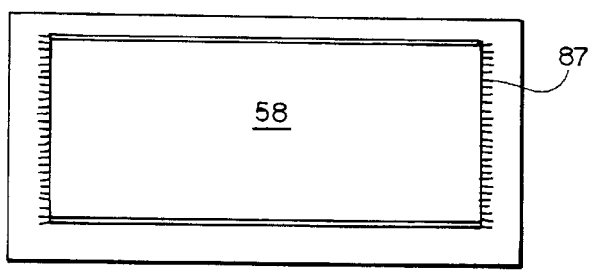
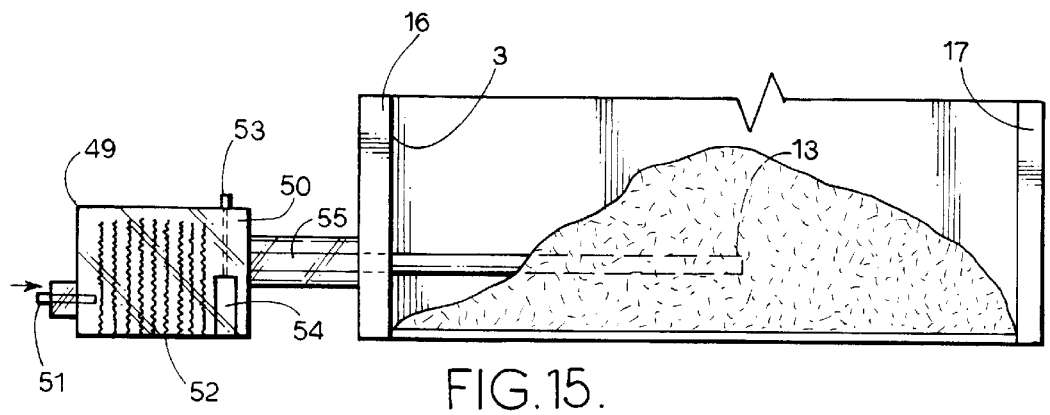

COMPOST, SILAGE, SOLAR HEATING APPARATUS

BACKGROUND OF THE INVENTION

1. Field of the Invention

This invention relates to an apparatus being an alternative source of heating. The apparatus employs various kind and forms of renewable energy. It combines solar heat, compost's bacterial-generated heat, and silage heat, temperature regularation and insulation. It employs ground radiated heat to lessen loss of usable heat collected and generated.

2. Description of the Prior Art

Conventional heating systems employ fossil fuel consumption directly or indirectly. These pollute, especially the older heating stoves and furnaces. They consume fossil fuels which are rapidly declining in many parts of the world. Liquid fossil fuels, including petroleum and natural gases, are declining in the United States. The present apparatus is an alternative device addressing these concerns and other problems, such as the pervasiveness of manure.

The present apparatus supplies heat from solar energy and unique renewable sources and combinations and employs unique insulation means to conserve significant useable heat. In addition, compost and silage within the apparatus stores and regulates a more even output temperature to be utilized day and night. Also, there are a variety of solar heat methods, including periodically heating and supplying of humidity by a connected solar preheater mechanism to the compost pile's interior.

There are a range of solar devices which heat water or space. However, the present invention heats with solar and other forms of heat from renewable energy, including heat from the ground to lessen loss of heat from the other sources. Also, it uses the renewable sources for partial heat storage and other purposes; i.e., silage creates a slight amount of heat while effectively insulating airflow components and storing heat. It helps regulate a more even heat output of the apparatus.

There are ubiquitous problems in domestic supplies of fossil fuels, foreign supplied, and domestic energy production entities. Inevitably it will worsen in relation to liquid fossil fuels. The foreign supplies could be disrupted (as it was during 1973). There are also hidden costs and taxes of importing fossil fuels; i.e., U.S. military protection of Persion Gulf shipping lanes. There are developing future problems associated with declining domestic liquid fossil fuels. The U.S. petroleum and natural gases reserves are dwindling significantly. (According to authoritative sources, U.S. imports of crude petroleum is over 53% now. Domestic natural gases declined by approximately 50% between 1970 and 1994.)

Heretofore, it is the first apparatus to efficiently generate and conserve heat from passive solar, compost, and silage and other sources while allowing creation a significant portion of its own insulation and while allowing previously unrelated benefits to heating systems.

SUMMARY OF THE INVENTION

The present apparatus provides a compartment having solar collective means with a connecting cylinder submerged below a compost pile. The subsurface compost cylinder connects to an upper solar collection unit. A second chamber combines solar collectors and silage storage advantages. A subsurface cylinder within the silage storage connects to the upper solar pipe collector. Also, within the solar system, friction is a designed source of useable heat production. An outlet airflow pipe connects to an extrinsic building or other entity. Thus, allowing a continuing airflow into the apparatus. A blower mechanism blends higher air of extrinsic room with airflow of apparatus.

OBJECTS OF THE INVENTION

The principal objects of the present invention are: to provide a compost, silage, solar heating apparatus; to provide an apparatus which provides partial or auxiliary heat for home, farm use, and industry; to provide an apparatus which can be employed in refining processes, such as preheating; to provide an apparatus which employs several dimensions and phases of usable solar heat; to provide an apparatus which allows solar energy to enhance heat production in compost; to provide an apparatus which allows compost heat combining with solar heat for usable purposes; to provide an apparatus which provides heated ventilation for subsurface of compost pile to aid in additional heat production; to provide an apparatus which provides subsurface humidity to compost pile to aid in heat generation; to provide an apparatus which combines compost, solar, and silage for efficient heat production for usable purposes; to provide an apparatus which lengthens airflow distance with stones; to provide an apparatus which employs air friction; to provide an apparatus which stores solar heat in solar components; to provide an apparatus which stores heat temporarily in compost pile; to provide an apparatus which stores solar and compost heat in silage; to provide an apparatus which regulates temperature level; to provide such an apparatus which can reduce heating expenses; to provide such an apparatus with means to adjust to temperature; to provide such an apparatus which is quiet in operation; to provide such an apparatus which does not pollute significantly; to provide such an apparatus which is economical to manufacture, efficient in use, capable of a long operating life, and particularly well-adapted for the proposed uses.

By-product advantages are to provide such an apparatus which aids in compost development for garden and farm uses; and to store a small amount of silage for use as a stock feed in the spring.

Other objects and advantages of this invention will become apparent from the following description taken in conjunction with the accompanying drawings wherein are set forth, by way of illustration and example, certain embodiments of this invention. (This includes heat insulation, heat development advantages denoted in the last four pages of the detailed description of the preferred embodiment.)

The drawings constitute a part of this specification and include exemplary embodiments of the invention and illustrative various objects and features thereof.

BRIEF DESCRIPTION OF THE DRAWINGS

FIG. 10 is elevated back stacked solar collectors showing fragmented view of stone within lowest solar collector to lengthen airflow path and increase airflow friction.

FIG. 11 is an enlarged view of protective sleeve.

FIG. 12 is an enlarged detail of the protective sleeve showing a transversing pipe and spacer.

FIG. 13 is a pipe schematic of system including solar collectors and submerged pipes comprising the present apparatus.

FIG. 14 is a top insertion door with straw and silicone crack fillers.

FIG. 15 is an exterior solar preheating mechanism showing arrangement of developing humidity.

DETAILED DESCRIPTION OF THE PREFERRED EMBODIMENT

Figure 1:
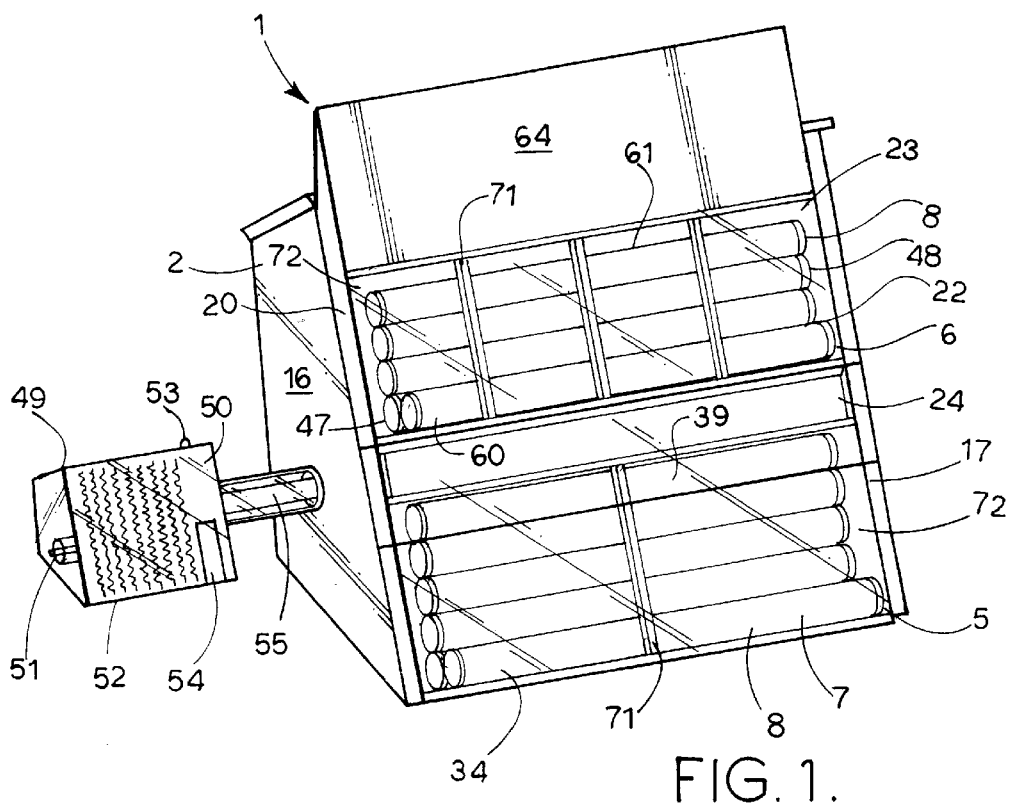
FIG. 1 is a compost, silage, solar heating apparatus, including solar collector units.

As required, detailed embodiment of the present invention is disclosed herein; however, it is to be understood that the disclosed embodiments are merely exemplary of the invention which may be embodied in various forms. Therefore, special structural and functional details disclosed herein are not to be interpreted as limiting, but merely as a basis for the claims and as a representative basis for teaching one skilled in the art to variously enjoy the present invention in virtually any appropriate detailed structure.

Referring to the drawings in more detail, the reference numeral 1 generally refers to a compost, silage, solar heating apparatus. Generally wood is employed in a primary housing 2. Wood is employed as a result of being a poor conductor of heat. Thus, conserving heat within apparatus 1. The wood is shielded from fairly high heat by materials, such as insulation, tempered masonite, high-temperature sealant.

The primary housing 2 contains a compost chamber 3, a silage chamber 4, a separated lower passive solar collector compartment 5, and a separated upper passive solar collector compartment 6. The compost chamber 3 is at ground level 200. The compost chamber 3 contains the separated front solar collector compartment 5 having a lower solar collector unit 7. The lower solar collector unit 7 consists of a plurality of capped solar collector pipes 8. The capped solar collector pipes 8 are of a coloration, such as flat black, to efficiently absorb solar energy.

Figure 2:
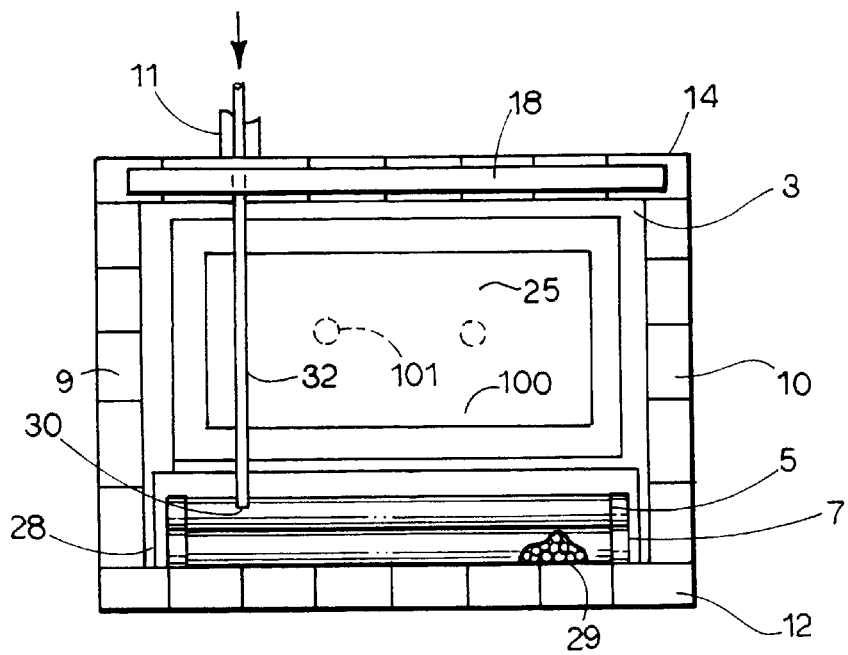
FIG. 2 is a compost pile pit showing a transversing inlet airflow pipe connecting lower solar collector unit.

Referring to FIG. 2, the foundation ends 9, 10 have slightly spaced concrete blocks 12 to allow slight air access to compost pile 13 within compost chamber 3. Each foundation end 9, 10 and foundation black 14 of apparatus 1 has a lean-to 15, such as solar plastic, oriented at ground level 200 and extending to lower portion of insulated end walls 16, 17. The lean-to 15 periodically slightly heats under solar influence, and prevents or slows direct wind access.

Figure 6:
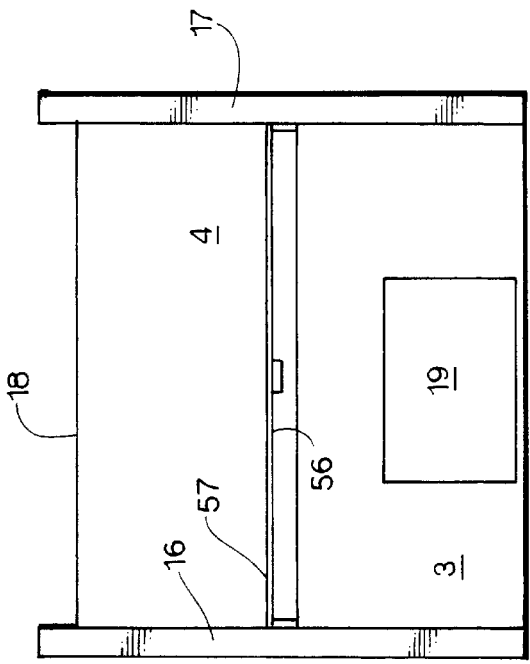
FIG. 6 is frontal fragmentary, longitudinal section of apparatus showing a back insertion door in compost chamber.
Figure 5:
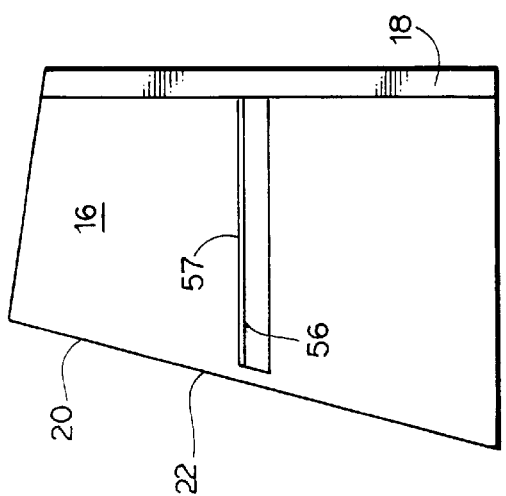
FIG. 5 is a fragmentary elevated end section of compost, silage, solar heating apparatus showing the compost chamber and the silage chamber.
Figure 7:
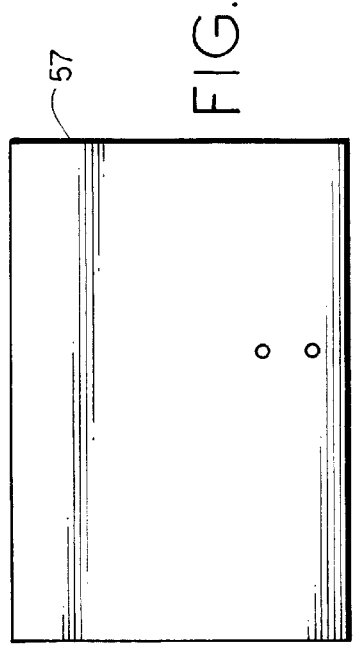
FIG. 7 is a plan view of longitudinal partition which constitutes floor of silage chamber.
Figure 8:
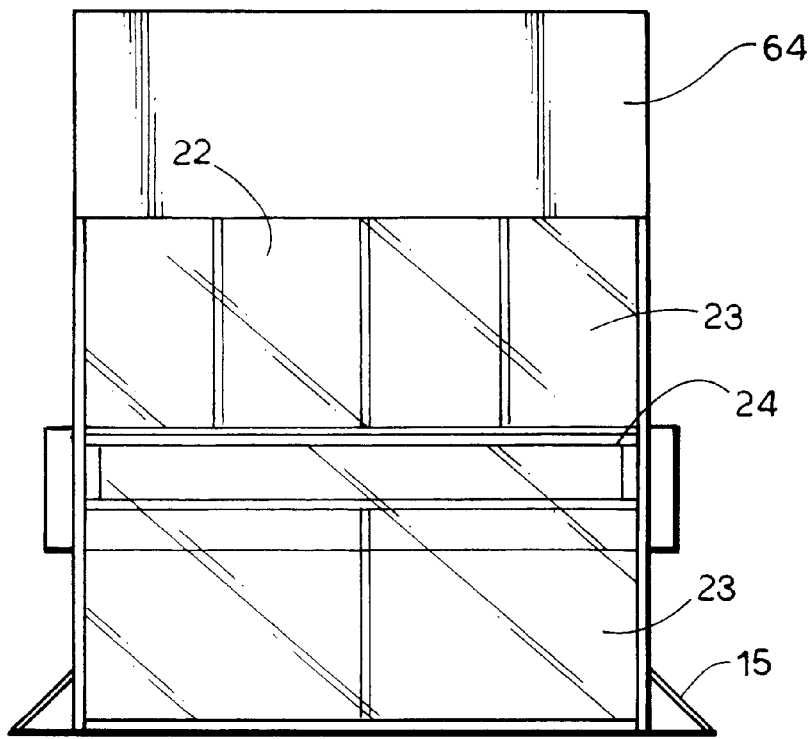
FIG. 8 is an elevated front including transparent solar material and top reflector.
Figure 9:
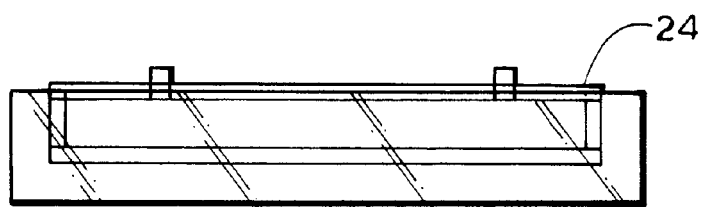
FIG. 9 is a front hinged door to allow periodic additions to compost pile.

Referring to FIG. 6, the compost chamber 3 consists of a back insulated wall 18 having a lower access door 19. There is dried silicone bead (not shown) about the door 19 to lessen heat loss. The back insulated wall 18 adjoins to the insulated end walls 16, 17. Referring to FIG. 1, the ends 16, 17 are similarly angled on their fronts 20 to provide proper orientation to winter solar influence. The angled front 22 consists of a dual arrangement of solar material 23 which allows access of solar light. The front 22 adjacent to upper portion of compost chamber 3 has a hinged door 24 allowing periodic introduction of compost materials while also admitting fresh air simultaneously. The back 18 and ends 16, 17 have interior material to prevent moisture and temperature damage, such as tempered masonite.

Referring to FIG. 2, at ground level 200 is a central hole 25 to receive the lower portion of compost pile 13. A plurality of coarse plant stocks, such as corn stocks, are crisscrossed over the bottom and up the sides of the pit 25 allowing for better air penetration into compost pile 13.

Figure 3:
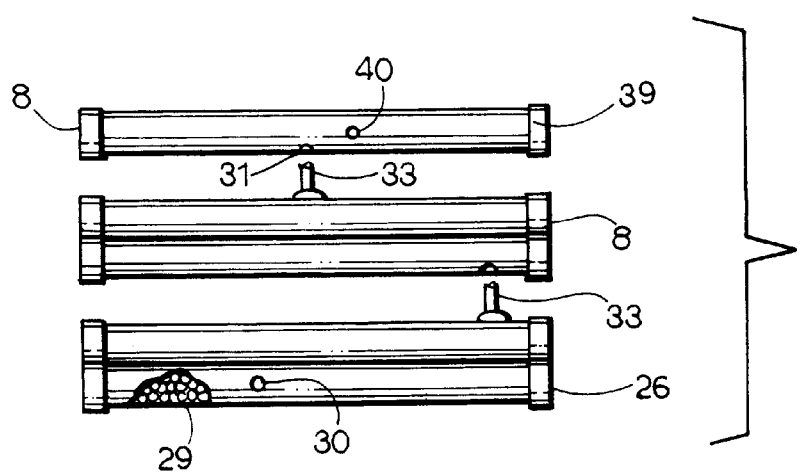
FIG. 3 is the means of connecting stacked solar collectors.
Figure 4:
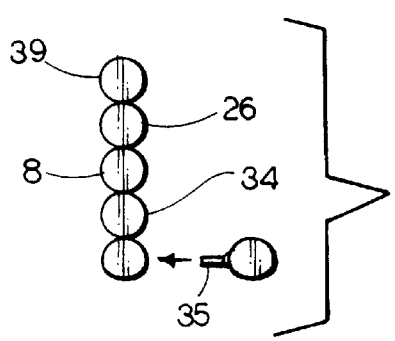
FIG. 4 is the disposition of the entire arrangement of lower solar collectors.

Referring to FIGS. 3, 4, the lower solar collector unit 7 primarily consists of a plurality of thin solar collector pipes 26. The plurality of generally vertical stacked thin solar pipes 26 are oriented one upon another. The lowest solar collector pipe 27 is supported by bricks 28. The lowest solar collector pipe 27 receives numerous one inch to one and one-half inch stones 29 through orifices 30, 31. Referring to FIG. 2, orifice 30 receives an inlet airflow pipe 32 from an extrinsic entity 210, generally a building. The inlet airflow pipe 32 is centered within a transparent solar pipe between extrinsic building 210 and primary housing 2. The inlet airflow pipe 32 transverses the compost chamber 3. While the compost pile 13 is in place, inlet airflow pipe 32 transverses below its surface. Again referring to FIGS. 3, 4, orifice 31 receives an angled pipe 33. Angled pipe 33 is angled on both ends to connect two vertical thin solar pipes 26 together. All pipes 26 are secured while filling gaps with high-temperature sealant, such as high-temperature silicone.

Referring to FIG. 4, a second solar collector pipe 34 is oriented in front of the lowest solar collector pipe 27. The second solar collector pipe 34 operably connects to the lowest stacked solar collector pipe 27 with an end-angled pipe 35 (similar to angled pipe 32). Both solar collector pipes 34, 27 are supported on bricks 28, and both contain heat-absorbing hard stones 29. Thus, creating more and longer airflow paths. The stones are of a size which do not impede airflow therethrough. Greater friction is developed by flowing over more heated surfaces. The air expands with heat to create additional friction. Also, friction develops as a result of pipe system 36 design through which airflow is drawn back to the extrinsic building 210 by a blower mechanism 37 having a fan 38.

Referring to FIG. 13, in top solar collector pipe 39 of the lower collector unit 7 has an orifice 40 to receive an end-angled connective pipe 41. The opposing end 42 accesses an orifice 41 in a thin compost subsurface pipe 44. The thin compost subsurface pipe 44 has a second orifice 45. The thin compost subsurface pipe 44 receives a connective pipe 46 operably connecting it to the back lowest solar collector 47 in the upper solar collector unit 48.

Referring to FIG. 15, a solar preheater component 49 sets on the exterior of the compost chamber 3 near insulated end wall 16. The solar preheater mechanism 49 consists of a solar material enclosure 50. There is an air access pipe 51 allowing the introduction of extrinsic air. There are a plurality of vertically oriented solar-absorbing fins 52. The fins 52 are generally black or dark green to absorb solar heat. A manually closable capped orifice 53 allows introduction of water to create humidity periodically. A water container 54 is situated to receive water to create humidity for the compost pile 13 in the compost chamber 3. The water container 54 is adjacent to a solar-heat absorbing outlet pipe 55 connecting at a subsurface level with compost pile 13. This allows humidity and air ventilation to the compost pile 13.

The top 56 of compost chamber 3 also acts as the floor 57 of silage chamber 4.

The silage chamber 4 has a top insertion door 58. Referring to FIG. 14, door 58 has straw and beads of dried silicone 98. Door 58 helps compress silage. That is important in developing and retaining heat.

The upper solar collector compartment 6 has a reflective divider 59. The reflective divider 59 supports a portion of silage storage. The back lowest solar collector pipe 47 of the upper solar unit 48 operably connects with a front solar collector pipe 60. Both collector pipes 47 and 60 contain one inch to one and one-half inch hard stones 29.

The stacked pipes 61 of the upper solar collector unit 48 is connected with a plurality of short angled-end pipes 62 through a series of orifices 63. Top solar collector 64 has a second orifice 65. That orifice 65 receives a heated airflow outlet pipe 66. The heated airflow outlet pipe 66 transverses the silage chamber 4. Referring to FIGS. 11, 12, it has a sleeve 67 with a spacer 68 there-between.

Referring to FIG. 13, silage is packed in layers of approximately ten inches. A small amount of salt preservative is sprinkled over the layer. After the layers are placed in the apparatus 1 to the top, a small amount of straw 69 is placed on it. It is compressed by closing the top insertion door 58.

The outlet heat pipe 66 continues through the back 18 of the apparatus 1. It is surrounded with thick coat of high-temperature silicone at the distance through the back wall 18 of the apparatus 1. The outlet heat pipe 66 continues to the extrinsic building 210. The outlet pipe 66 is centered at a distance from a transparent pipe 70.

A slanted front 22 of the apparatus 1 adjacent to the silage compartment 4 consists of an insulated wooden top portion 71 and a solar transparent material portion 72 adjacent to the upper solar pipe compartment 6.

A movable material (not shown), such as canvas, covers a portion of back wall 18 and sunrise-end 17 of apparatus 1. The movable material can be moved to protect the solar material front 22 of the apparatus 1 during summer.

Figure 19:
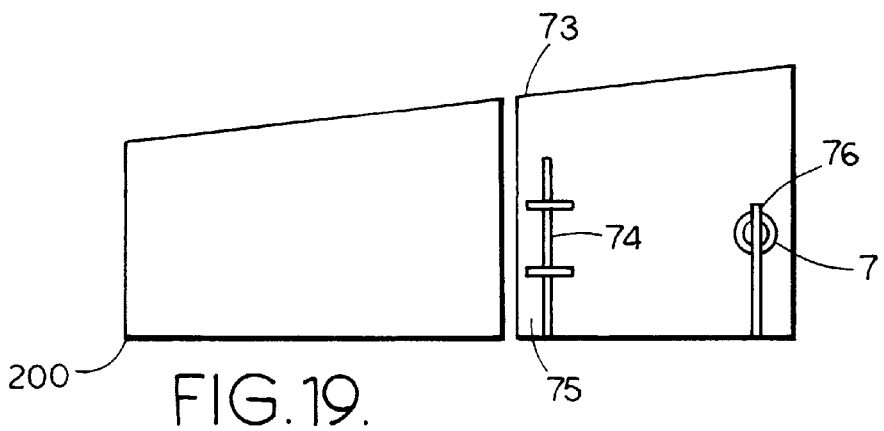
FIG. 19 is a two-sided reflective fence having one pivotal section.

As shown in FIG. 19, a two-sided reflective fence 73 is situated at an angle to reflect rays from the winter sun into and onto the device. A pivotal means consists of a pivotal pipe 74 toward one end 75. A spring on a post 76 contacts far end 77 allowing it to be blown sideways while the wind is strong and adverse to the operation of apparatus 1.

Figure 20:
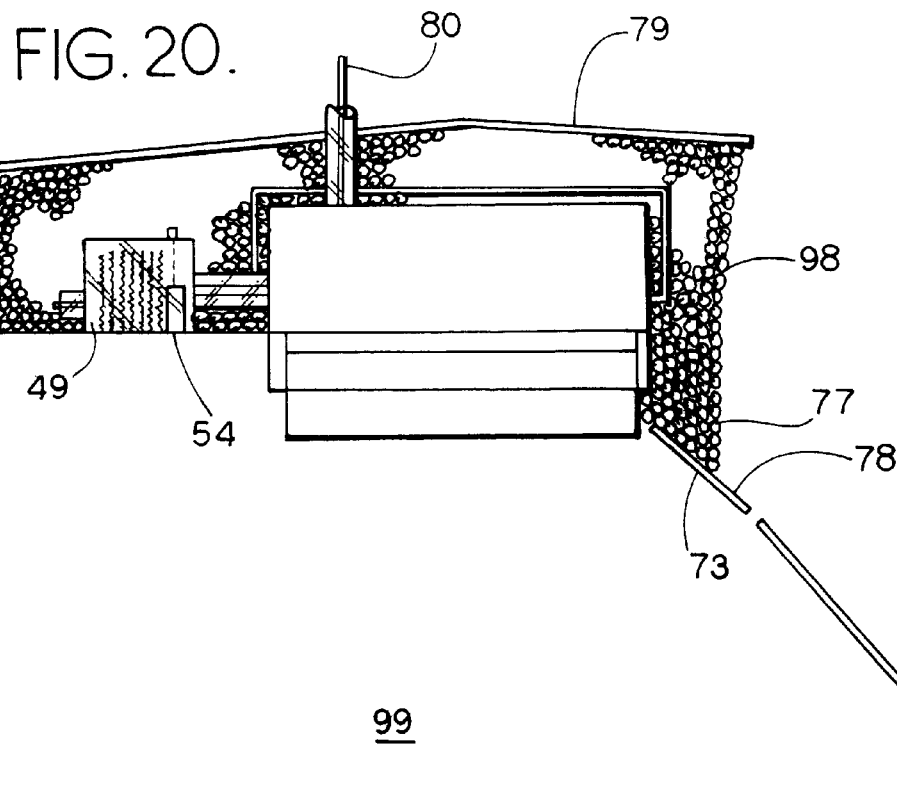
FIG. 20 is an arrangement of apparatus and showing reflective components and areas.

Referring to FIG. 20, the back side 78 of the two-sided reflective fence 73 is reflective also. It deflects solar light onto a curved back reflector 79 and upon an angled end reflector 97 to deflect solar light onto the solar preheater mechanism 49.

Figure 16:
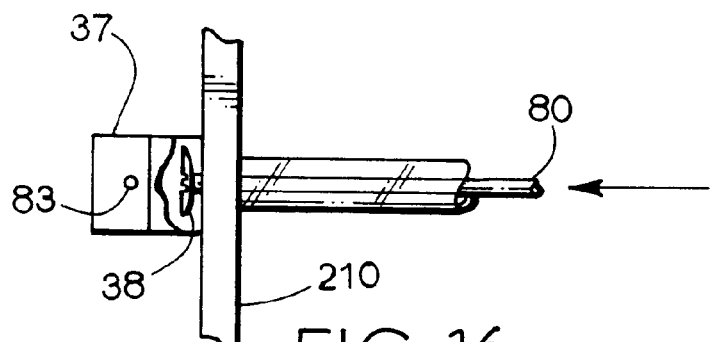
FIG. 16 is a plan view of an outlet blower mechanism projection circulated airflow through apparatus while blending air from extrinsic upper interior building.
Figure 17:
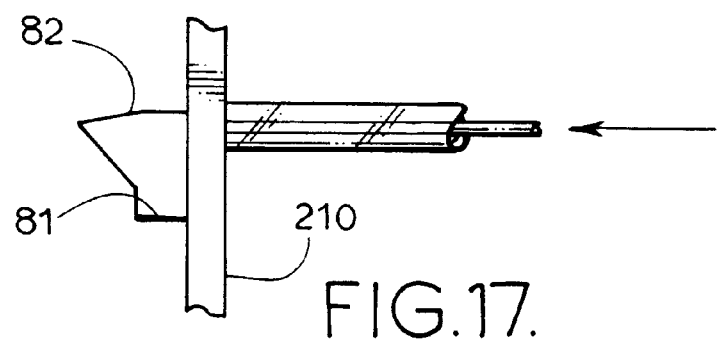
FIG. 17 is side view of the outlet blower mechanism.
Figure 18:
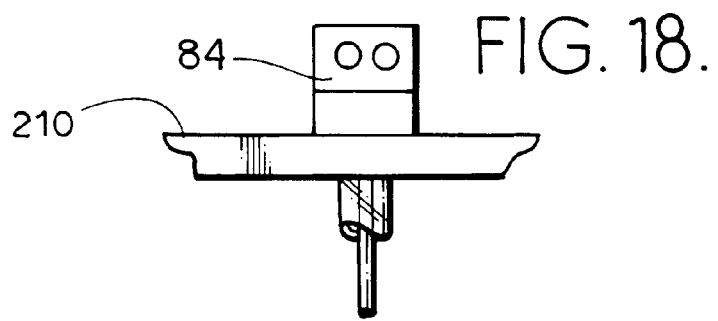
FIG. 18 is bottom view of outlet blower mechanism having outlet airflow orifices.

In reference to FIGS. 16, 17, 18, the fan 38 having two speeds is within a blower housing 37 affixed to the end of heated airflow outlet pipe 80 between primary housing 2 and interior of extrinsic building 210. The fan 38 is used to draw air through apparatus 1. The lower speed is to be used when the apparatus 1 is receiving less solar influence. High speed is to be empolyed on sunny winter days. Low is better for cloudy days and nights. The fan 38 uses either A.C. or D.C. electricity. Fan 38 is placed in the blower mechanism 37 at a lower than outlet pipe level 81. The blower mechanism 37 has a housing 82 with a top orifice 83 to receive air from the interior of the extrinsic building 210. This allows a blending of the airflow from the apparatus with the interior air before it is exhausted through bottom orifices 84 in the blower housing 37. The fan 38 pulls warm air from the upper portion of the building 210. Thus, it is warmer than lower building air. The heated airflow is forced downward. The blower mechanism 37 mixes the airflow from the apparatus 1 to create a blended temperature for greater comfortable outlet airstream.

In application, there are a large range of heat-production means. A variety of them are denoted below. They include: The expanding air results from heat absorption from compost, solar collectors and periodically from silage. Friction resulting from expanding warming air rubs on pipes and lengthen flow path through stones in specific solar collectors. Friction also results by airflow collisions from configuration of and size of pipes.

Compost has heat development from bacterial actions. Heat is enhanced from other sources which in turn creates more bacterial actions in compost which also results in additional compost heat. Greater heat is developed from greater varieties of ingredients having different beneficial bacteria. Depending on the compost ingredients, there is a degree of chemical actions. Further, natural earthworms operate on the lower portion of compost pile breaking down materials to provide a large bacterial-action surfaces. The worms excretions are important to a degree of heat production. By employing the hottest compost materials, including horse manure and sea weed, allow greater compost heat production.

Solar energy collector units 7, 48 allow direct and indirect collection of solar energy from reflective mechanism 64, 73, and plan ground reflector 99. Apparatus 1 has good insulation.

Silage develops a slight amount of heat and minute solar heat storage is salt preservative.

Ground heat does not directly contribute to heat production, but for maintaining good ground temperature to lessen interior-apparatus 1 loss. Ground heat conduit pipes 101 oriented in the bottom of the pit 100 conveys warmth from deeper depths. Earthworm action in the ground below the pit help with heat production.

Apparatus 1 preserving heat is nearly as important as heat production. This includes usable heat from the ground pit 100 and ground heat conduit pipes 101 oriented in vertical subsurface below pit. Rock covering 98 about the circumference of apparatus 1 absorbs some direct solar energy while preserving some degree of ground-radiant heat. In addition, the R-value of walls 16, 17, 18 combine in benefit with major insulation value of silage, significant insulation of compost, and partial cover for back 18 and sunrise-end 17 of apparatus 1. Further, transparent material 11, 70 about inlet pipe 32 and outlet pipe 80 help insulate them and apparatus 1.

Periodic solar influence on apparatus 1, include direct solar influence, reflective solar energy, including on the back 18 and end 16 or 17 of the apparatus 1 while sun is not periodically situated to influence one or the other directly.

The heat output is regulated by several major factors. Compost can absorb heat to return to compost subsurface pipe 44 while excessively hot which will be returned later. The solar-rock storage 29 within the lowest solar collectors 27, 34, 47, 60 of each unit 7, 48 absorbs some amount of heat for later use. Silage can absorb some heat and return it as needed to the silage subsurface pipe 66. The blower mechanism 37 within the extrinsic building 210 mixes generally warmer air with apparatus 1 airflow.

In addition, some preserving heat means is inseparable to heat creation and collection. These include various factors, such as heat from dug put 100. Rock covering 98 about circumference absorbing some degree direct solar energy while preserving some amount of ground-radiant heat.

Various factors relating to insulation. R-value of walls and roof, important insulation value of silage, significant insulation of straw coverings, significant insulation of compost, and partial cover for back 18 and sunrise-end 17 of apparatus 1 helps contain usable energy. Also, warmer air from top of extrinsic room is used beneficially with airflow from apparatus 1.

In operation, compost is placed in its chamber 3 for the amount of heat needed in the particular area. For instance, in colder areas, more horse manure, sea weed can be included with a variety of other substances, including green materials.

Tests, experiments, consultations, research have been done on heat factors on various arrangements of materials and components. There is a heat safety factor of at least 40° F. Thus, it is important to employ materials in compost of the appropriate heat production. For instance, in the Northern Hemisphere, the farther north used, the hotter the compost should be. Within the apparatus during winter, compost can achieve 155° F. or hotter. During winter, silage can reach upto 122° F. or hotter. The solar collectors can reach 180° F. or hotter.

Heat in compost within the apparatus 1 is replenished, and, is some cases, added to compost and silage heat production.

There is a dark coloration about the ends 16, 17 and back 18 of apparatus 1 to absorb solar heat. It generally consists of stones. This can slightly lessen heat loss.

A reflective material 96 over stone ground covering 95 is at or near ground level 200 to enhance solar energy reflection into and upon apparatus 1.

In the rear of the site, there can be windbreak shrubs in a shape and coloration to slightly enhance solar reflection on apparatus 1.

It is to be understood that while certain forms of the present invention have been illustrated and described herein, it is not to be limited to the specific forms or arrangement of parts described and shown.

What is claimed and described to secure by Letters Patent is as follows:

1. A compost, silage, solar heating apparatus which comprises:

(a) a compost chamber with a top;

(b) a silage chamber oriented above said compost chamber; and (c) a solar collector system transversing said silage chamber and said compost chamber.

2. The apparatus according to claim 1 which includes:

(a) a foundation having a plurality of blocks arranged end to end and having a space between said ends in order to provide air access to the compost chamber interior.

3. The apparatus according to claim 1 which includes:

(a) said compost chamber having compost operably connected to an adjacent solar preheater mechanism.

4. The apparatus according to claim 3 which includes:

(a) said solar preheater mechanism operably connecting a subterranean compost pile and introducing humid air and periodic heat thereto.

5. The apparatus according to claim 1 which includes:

(a) said solar collector system having upper and lower solar collectors and an apparatus inlet pipe operably connecting said lower solar collector and an extrinsic building allowing airflow from an extrinsic source.

6. The apparatus according to claim 5 wherein;

(a) said lower passive solar collector of said solar collector system contains stones therein allowing heat absorption and airflow therein with temperature changes.

7. The apparatus according to claim 6 wherein:

(a) said stones provide more and extended airflow paths creating friction heat airflow therein.

8. The apparatus according to claim 5 wherein:

(a) said lower passive solar collector unit is operably connected to an elevated subsurface pipe within said compost pile.

9. The apparatus according to claim 8 wherein:

(a) said positioned and arranged to create heat, absorb excessive heat from said subsurface pipe, insulate said subsurface pipe, admits and returns heat to airflow through said compost chamber to adjust airflow temperature.

10. The apparatus according to claim 8 wherein:

(a) said subsurface compost pipe is operably connected to said lower solar collector in a front portion of said compost chamber.

11. The apparatus according to claim 1 which includes:

(a) said solar collector system which comprises upper and lower collector units and a pipe operably connecting said units; and (b) a reflective housing in said silage chamber, said reflective housing separating said silage chamber and said upper solar collector unit.

12. The apparatus according to claim 5 which further includes (a) a silage subsurface pipe within silage chamber connected to highest point of said upper solar collector.

13. The apparatus according to claim 12 wherein (a) said silage subsurface pipe has a spaced sleeve affording safety and providing space for blending of various temperatures.

14. The apparatus according to claim 12 which further includes (a) an outlet pipe connecting said subsurface pipe within said silage chamber and the extrinsic building allowing heated airflow into the extrinsic building.

15. The apparatus according to claim 14 which further includes (a) an outlet blower mechanism operably connecting said outlet pipe to the extrinsic building allowing blending of air from said apparatus and warm air within the extrinsic building.

16. The apparatus according to claim 14 which includes:

(a) said outlet pipe having a spaced transparent pipe helping conserve and periodically collect heat.

17. The apparatus according to claim 5 which includes:

(a) a pivotal two-sided reflective fence enhancing solar energy reflected upon said lower solar collector and said upper solar collector and upon an exterior of said apparatus.

18. A compost, silage, solar heating apparatus which comprises:

(a) a preheater solar mechanism connecting apparatus;

(b) a compost chamber within a lower portion of apparatus;

(c) a solar compartment adjacent to said compost chamber;

(d) a transversing pipe connecting compost chamber with solar compartment;

(e) an elevated passive solar collector unit connecting lower said solar compartment operably by means of pipe; and (f) a silage chamber mounted on top of said compost chamber and having transversing pipe connecting elevated passive solar collector unit and extrinsic entity.

19. The apparatus according to claim 5, which includes:

(a) said solar collector system having pipes conveying heated air therethrough;

(b) said lower solar collector having stone paths therethrough;

(c) compost located in said compost chamber and supporting bacterial action;

(d) silage located in said silage chamber; and (e) said apparatus further receiving heat from direct, reflected and deflected solar energy, ground radiation, and heated air in said extrinsic building.

* * * * *